United States Patent
Vijayrao et al.

(10) Patent No.: US 9,490,996 B1
(45) Date of Patent: Nov. 8, 2016

(54) HOME AUTOMATION DEVICE

(71) Applicant: Facebook, Inc., Menlo Park, CA (US)

(72) Inventors: Narsing Vijayrao, Santa Clara, CA (US); Giovanni Coglitore, Saratoga, CA (US)

(73) Assignee: Facebook, Inc., Menlo Park, CA (US)

( * ) Notice: Subject to any disclaimer, the term of this patent is extended or adjusted under 35 U.S.C. 154(b) by 75 days.

(21) Appl. No.: 14/690,054

(22) Filed: Apr. 17, 2015

(51) Int. Cl.
*H04L 12/28* (2006.01)
*H04L 12/58* (2006.01)
*H04W 4/00* (2009.01)

(52) U.S. Cl.
CPC ........... *H04L 12/2803* (2013.01); *H04L 51/32* (2013.01); *H04W 4/008* (2013.01)

(58) Field of Classification Search
CPC ....... H04L 12/12; H04L 12/16; H04L 12/28; H04L 12/282; H04L 12/2803; H04L 12/2807; H04L 12/2814; H04L 12/2816; H04L 51/32; H04L 67/125; H04L 2012/284–2012/285; H04W 4/008; H04M 11/00; H04M 11/04; G05B 11/01; G05B 15/00
See application file for complete search history.

(56) References Cited

U.S. PATENT DOCUMENTS

| | | | | |
|---|---|---|---|---|
| 7,844,353 | B2* | 11/2010 | Bejean | G08C 17/00 455/41.2 |
| 8,638,211 | B2* | 1/2014 | Cohn | G08B 29/02 340/506 |
| 2003/0040813 | A1* | 2/2003 | Gonzales | H01H 15/005 700/19 |
| 2007/0112939 | A1* | 5/2007 | Wilson | H04L 12/2807 709/219 |
| 2010/0138007 | A1* | 6/2010 | Clark | H04L 12/281 700/90 |
| 2013/0052946 | A1* | 2/2013 | Chatterjee | H04W 4/008 455/41.1 |
| 2014/0244040 | A1* | 8/2014 | Alberth, Jr. | H04L 12/2803 700/275 |
| 2016/0043896 | A1* | 2/2016 | Fiedler | H04L 41/0803 370/254 |

* cited by examiner

*Primary Examiner* — Tri H Phan
(74) *Attorney, Agent, or Firm* — Perkins Coie LLP

(57) ABSTRACT

The present disclosure relates to a home automation system that is automated based on user preferences provided by a social networking system, where the home automation system provides a short-range, high-speed wireless connection that is contained within the safe boundaries of a home. Briefly described, the home automation system employs one or more home automation devices to control various home devices within the home based on detection of one or more users' social profile, where each home automation device is configured to broadcast and communicate via a short-range, multi-gigabit-per-second (MGbps) wireless communication link that can be utilized by the various home devices. Furthermore, each home automation device is configured to be self-tuning, thereby enabling automatic efficient management of the MGbps wireless communication link.

20 Claims, 8 Drawing Sheets

HOME AUTOMATION DEVICE

RELATED FIELD

At least some embodiments of the disclosure relate generally to home automation systems, and more particularly to a home automation system that provides a short-range, high-speed wireless communication link for enabling automated control of home devices through connection with a social networking system.

BACKGROUND

Currently available home automation systems provide convenience and safety by allowing remote control of various home devices (e.g., electrical appliances, mobile computing devices, etc.) within a home. These home automation systems typically utilize adapters (e.g., control switches) that are coupled to the home devices located throughout the home. However, setting up the adapters can require a substantial amount of customization. Therefore, it is often difficult to integrate these home automation systems into old homes, which are not equipped to communicate with new technologies. Furthermore, a home user is often required to memorize certain command codes or configuration settings and/or manually configure the adapters in order to adjust the devices. Accordingly, existing home automation systems, which are supposed to alleviate and enhance home living, are simply inadequate and unnecessarily burdensome.

DETAILED DESCRIPTION

Figure 1:
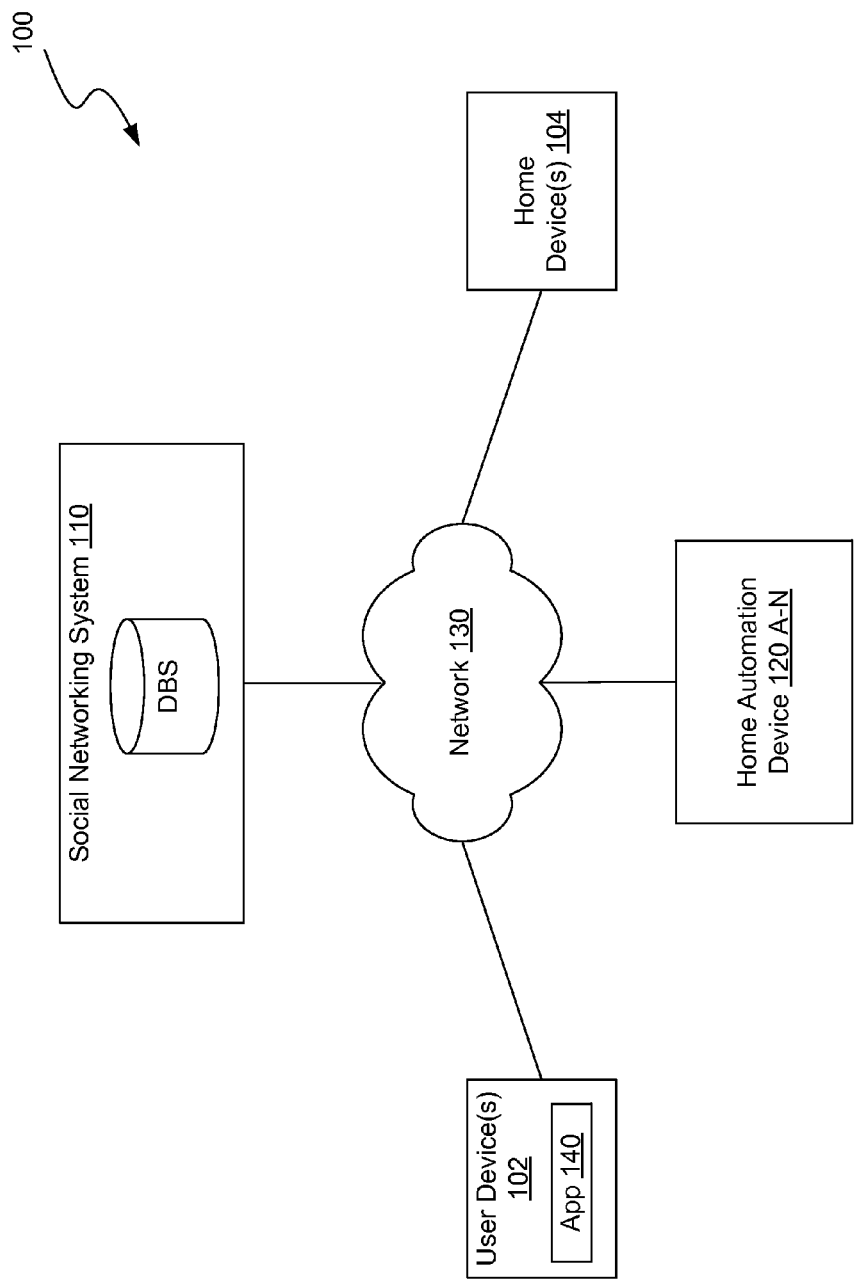
FIG. 1 illustrates an example of a network-based environment in which a home automation system can be implemented in accordance with various embodiments.

Various embodiments of the present disclosure relate to a home automation system that provides a short-range, high-speed wireless communication link for enabling automated control of one or more home devices through connection with a social networking system. Traditionally, home automation systems often rely on Wi-Fi® to communicate with various home devices for enabling home automation. Reliance on Wi-Fi®, however, poses several problems. First, a Wi-Fi® signal often cannot reach some areas of a home that are known as "dead zones." Typical solutions for overcoming these dead zones include amplifying the Wi-Fi® signal, setting up multiple access points (APs), or a combination of both. These solutions often lead to the WiFi® signal broadcasting beyond the boundaries of the home, thereby resulting in security risks of unwelcomed intruders gaining access to, and/or attacking, the home WiFi® signal. Second, some infrastructure change is often required to enable control of the home devices for home automation. Furthermore, manual configuration of the home devices is needed to set up preferences for every individual in the home. As a result, satisfying every individual's needs can be burdensome, especially when new individuals (e.g., guests) are present in the home.

In contrast, various embodiments of the present disclosure enable a truly automated home automation system based on user preferences provided by a social networking system, and further allow for a short-range, high-speed wireless connection that is contained within the safe boundaries of the home. Briefly described, the home automation system employs one or more home automation devices to control various home devices within the home based on detection of one or more users' social profile, where each home automation device is configured to broadcast and communicate via a short-range, multi-gigabit-per-second (MGbps) wireless communication link that can be utilized by the various home devices. Each home automation device is further configured to be self-tuning, thereby enabling automatic management of the MGbps wireless communication link.

In some embodiments, a home automation device includes an Ethernet powerline system integrated with a short-range MGbps wireless networking system. Among other benefits, integration of these two systems advantageously enables a high-speed wireless networking connection that is contained within the boundaries of the home, relieving home users from security risks typical for WiFi® systems. The MGbps wireless networking connection enables one or more home devices within the home to communicate, transmit information, and/or access various online content via a reliable, fast communication link. Furthermore, such connection enables the home automation device to control the home devices seamlessly based on user preferences retrieved from a social networking system via the same reliable, fast link.

In some embodiments, a particular home automation device is configured to communicate with one or more other home automation devices within the home to detect whether those home automation devices are broadcasting the high-speed wireless communication signal beyond their respective specified ranges. In such embodiments, the particular home automation device can transmit a message (e.g., a "power-down" message) to the other home automation device that has been detected to be broadcasting beyond its specified range (thereby invading the territory of the particular home automation device). The other home automation device, upon receiving the message, can tune, or readjust, its signal to limit the broadcasting within its specified range. This communication between the home automation devices advantageously provides automatic power management at the respective home automation devices such that no one device wastes power by broadcasting beyond its specified range.

In some embodiments, a home automation device is integrated with a social networking system to control the one or more home devices in accordance with preferences of one or more users of the social networking system. For example, based on user preferences of a particular user received from the social networking system, the home automation device can control a home thermostat to the liking of that particular user. In another example, based on the particular user's user preferences specifying permissions associated with a guest user, the home automation device can control the home thermostat to the liking of the guest user upon detecting the presence of the guest user in the home. In yet another example, based on those permissions, the home automation device can automatically provide to a computing device of the guest user access to the high-speed wireless networking connection within the home at the moment the guest user enters the home, without requiring authentication of the guest user (e.g., no prompting for a wireless access password).

In some embodiments, a home automation device provides a platform for adding on various electronic components that can be physically coupled to the home automation device. In some embodiments, the electronic components include a smoke detector, a carbon monoxide detector, a video streaming camera, an audio system (e.g., a speaker sound system), etc.

In some embodiments, the home automation device provides the capability to operate as a CPU for a user mobile device (e.g., a smart phone, a tablet, etc.). For example, the home automation device provides a "mirror cast" capability to enable, e.g., a smart phone, to launch a movie playing on a screen of the smart phone to another electronic device, e.g., a TV, by using the home automation device to grab frames of the movie from the smart phone.

In some embodiments, the home automation device provides an advertisement capability to introduce various products and/or services to a user at home. For example, the home automation device, based on user preferences associated with the social networking system, can retrieve and display advertisements related to TV shows in which the user would be interested.

In some embodiments the home automation device provides reminders to a user at home based on that user's preferences. For example, the home automation device can conjure up calendar event reminders (e.g., birthdays, family get-together, sports game, etc.). In another example, the home automation device can provide a verbal reminder (e.g., Buy milk), e.g., by connecting to a speaker within the home.

It is noted that the various embodiments of the disclosure can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to cause one or more processors to perform the methods, variations of the methods, and other operations described here. The machine-readable medium may include, but is not limited to, floppy diskettes, optical discs, compact disc read-only memories (CD-ROMs), magneto-optical discs, read-only memories (ROMs), random access memories (RAMs), erasable programmable read-only memories (EPROMs), electrically erasable programmable read-only memories (EEPROMs), application-specific integrated circuits (ASICs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the various embodiments, and may be included in more than one implementation. In addition, such phrases do not necessarily refer to the same embodiments or different embodiments. Furthermore, if the specification states a system, a component, or a feature "may", "can", "could", or "might" be included or have a characteristic, that particular component or feature is not required to be included or have the characteristic.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided here, one of ordinary skill in the art will appreciate a variety of ways in which connection or coupling exists in accordance with the aforementioned definition.

The term "component," "module," or "engine" refers broadly to general or specific-purpose hardware, software, firmware, or any combination thereof. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

FIG. 1 illustrates an example of a network-based environment 100 in which a home automation system can be implemented in accordance with various embodiments. As illustrated in FIG. 1, the network-based environment 100 includes one or more user devices 102, one or more home automation devices 120, and one or more home devices 108. The user devices 102 and the home automation devices 120 can be used to access a social networking system 110. These devices can use a network 130 to submit and/or retrieve information from the social networking system 110.

The user device 102 can be any computing device capable of receiving user input, as well as transmitting and/or receiving data via the network 130. In some embodiments, the user device 102 is a conventional computer system, such as a desktop or a laptop computer. In some embodiments, the user device 102 can be a mobile computing device having computer functionality, such as a personal digital assistant (PDA), a mobile telephone (e.g., a smart-phone), a tablet computer (e.g., an iPad®), a smartwatch, or a similar device. In some embodiments, the user device 102 executes an application 140 allowing a user of the user device 102 to interact with the social networking system 110. For example, the user device 102 can execute a browser application or a customized client to enable interaction between the user device 102 and the social networking system 110 via the network 130. In some embodiments, the user device 102 interacts with the social networking system 110 through an application programming interface (API) that runs on the native operating system of the user device 102, such as IOS® or ANDROID™.

The home automation system 100 can also include one or more home devices 108. A home device 108 can be any electronic appliances and/or electronic devices within a home. Examples of the home device 108 can include a thermostat, an air conditioning (AC) system, a lighting system, a video-security system, a door-lock system, an entertainment system (e.g., audio and/or video system), and the like. In some embodiments, the home device 108 is capable of transmitting and receiving data to and from the home automation device 120 via the network 130. In such embodiments, the home automation device 120 can transmit various instructions to control the home device 108 in accordance with preferences of a user profile retrieved from the social networking system 110.

The home automation device 120 can be any computing device capable of broadcasting a wireless communication signal or link at a multi-gigabit per second (MGbps) rate via the network 130, as well as transmitting and/or receiving data at the MGbps rate via the network 130. In some embodiments, the home automation device 120 interacts with the social networking system 110 through an application programming interface (API) that runs on the native operating system of the home automation device 120, such as IOS® or ANDROID™.

In some embodiments, the API can connect the home automation device 120 with the user device 102 via the application 140 running on the user device 102. For example, a user can launch the application 140 at the user device 102 to login to the social networking system 110, to connect and/or setup the home automation device 120, and to configure various settings associated with a user profile (or user account) of the social networking system 110. In such example, connecting and/or setting up the home automation device 120 can include, in some embodiments, connecting the home automation device 120 with one or more home devices 108. In some embodiments, upon setup, the home automation device 120 can control various home devices 108 in accordance with preferences of the user based on the settings associated with, or designated by the user profile. As a result, the home automation device 120 can facilitate the home devices 108 to operate automatically in accordance with those preferences, without being manually prompted by the user.

In some embodiments, the one or more home automation devices 120 A-N can communicate with one another to manage signal strength being broadcast by one another. For example, a home automation device 120 A, which is located in a living room, can detect a signal being broadcast by another home automation device 120 B, and can transmit a "power-down" message to the home automation device 120 B. In such example, the home automation device 120 B can tune, or adjust, its power (e.g., decrease a magnitude of the signal) based on the "power-down" message.

All of the devices 102, 104, and 120 can be configured to communicate via the network 130, which can comprise any combination of local area and/or wide area networks, using both wired and wireless communication systems. In some embodiments, the network 130 uses standard communications technologies and/or protocols. Thus, the network 130 can include links using technologies such as direct connect, such as Ethernet, worldwide interoperability for microwave access (WiMAX), wireless network (e.g., using Wireless Application Protocol (WAP)), IEEE 802.11a-x, IEEE 802.11 ad, 3G, 4G, CDMA, digital subscriber line (DSL), etc. Similarly, the networking protocols used on the network 130 can include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged via the network 130 can be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

Figure 2:
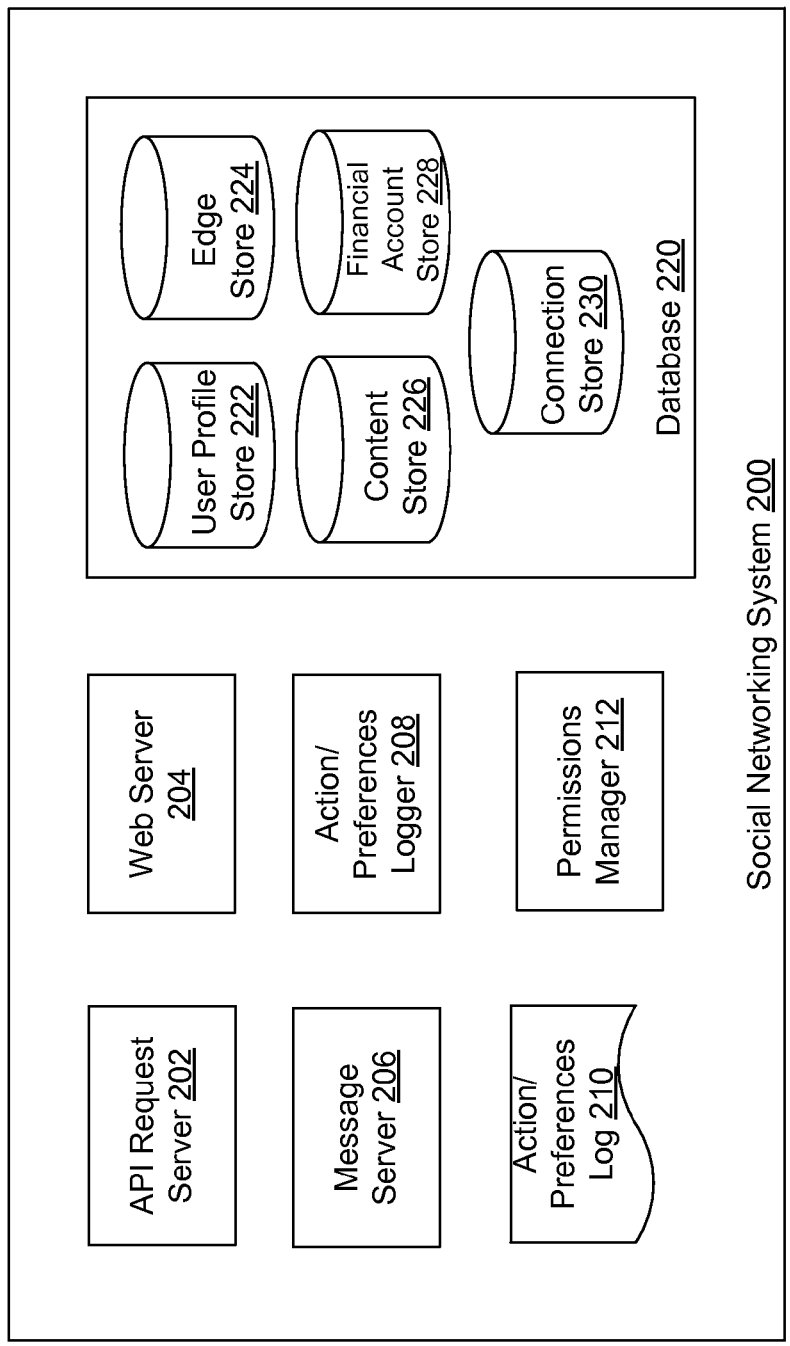
FIG. 2 illustrates a block diagram with components of a social networking system that can be used with one or more embodiments of the present disclosure.

FIG. 2 illustrates a block diagram with components of a social networking system 200 that can be used with one or more embodiments of the present disclosure. In some embodiments, the social networking system 200 can be the social networking system 110 of FIG. 1. As mentioned above, various embodiments of the present disclosure can be utilized with a social networking system. Typically, a social networking system includes one or more computing devices storing user profiles associated with users and/or other objects as well as connections between users and other users and/or objects. In use, users join the social networking system and then add connections to other users or objects of the social networking system to which they desire to be connected. The users may be individuals or entities such as businesses, organizations, universities, or manufacturers. The social networking system allows its users to interact with each other as well as with other objects maintained by the social networking system.

According to the embodiments shown in FIG. 2, the social networking system 200 includes an API request server 202, a Web server 204, a message server 206, an action/preferences logger 208, an action/preferences log 210, a permissions manager 212, and a database 220 (i.e., a user profile store 222, an edge store 224, a content store 226, a financial account store 228, and a connection store 230). In other embodiments, the social networking system 200 can include additional, fewer, or different components for various applications. Conventional components such as network interfaces, security mechanisms, load balancers, failover servers, management and network operations consoles, and the like are not shown so as to not obscure the details of the system architecture. Still yet, in some embodiments, two or more of the components illustrated in FIG. 2 can be incorporated into a single component, and/or a portion of the functionality of one or more of these components can be associated with a different component. For example, in some embodiments, the user profile store 222, the edge store 224, the content store 226, the financial account store 228, and the connection store 230 can be combined into a single component.

Each user of the social networking system 200 is associated with a user profile, which is stored in the user profile store 222. A user profile includes declarative data, or information, about the user that was explicitly shared by the user, and can also include profile information inferred by the social networking system 200. In some embodiments, a user profile includes multiple data fields, each data field describing one or more attributes of the corresponding user of the social networking system 200. The user profile information stored in user profile store 222 describes the users of the social networking system 200, including biographic, demographic and other types of descriptive information, such as work experience, educational history, gender, hobbies or preferences, location, and the like. A user profile can also store other information provided by the user, for example, images, videos, or other objects. In some embodiments, images of users can be tagged with identification information on users of the social networking system 200 displayed in an image. A user profile in the user profile store 222 can also maintain references to actions by the corresponding user performed on content items in the content store 226 and stored in the edge store 230.

A user profile can be associated with one or more financial accounts, allowing the user profile to include data retrieved from or derived from a financial account. A user can specify one or more privacy settings that limit information from a financial account that the social networking system 200 is permitted to access. In some embodiments, the privacy settings are stored in the user profile store 222. In some embodiments, the privacy settings are stored in the preferences store 232, which is further described below. In one example, a privacy setting limits the social networking system 200 to accessing the transaction history of the financial account and not the current account balance. As another example, a privacy setting limits the social networking system 200 to a subset of the transaction history of the financial account, allowing the social networking system 200 to access transactions within a specified time range, transactions involving less than a threshold transaction amounts, transactions associated with specified vendor identifiers, transactions associated with vendor identifiers other than specified vendor identifiers, or any other suitable criteria limiting information from a financial account identified by a user that is accessible by the social networking system 200. In some embodiments, information from the financial account is stored in the user profile store 222. In other embodiments, it can be stored in the financial account store 228.

In some embodiments, the edge store 224 stores the information describing connections between users and other objects on the social networking system 200 in edge objects. Some edges can be defined by users, allowing users to specify their relationships with other users. For example, users can generate edges with other users that parallel the users' real-life relationships, such as friends, co-workers, partners, family members, and so forth. Other edges are generated when users interact with objects in the social networking system 200, such as expressing interest in a page on the social networking system 200, sharing a link with other users of the social networking system 200, and commenting on posts made by other users of the social networking system 200. The edge store 230 also stores edge objects that include information about the edge, such as affinity scores for objects, interests, and other users. Affinity scores can be computed by the social networking system 200 over time to approximate a user's affinity for an object, interest and other users in the social networking system 200 based on the actions performed by the user. Multiple interactions between a user and a specific object can be stored in one edge object in the edge store 230, in some embodiments. In some embodiments, connections between users can be stored in the user profile store 222, or the user profile store 222 can access the edge store 230 to determine connections between users.

In some embodiments, the content store 226 stores content items associated with a user profile, such as images, videos, or audio files. Content items from the content store 226 can be displayed when a user profile is viewed or when other content associated with the user profile is viewed. For example, displayed content items can show images or video associated with a user profile or show text describing a user's status. Additionally, other content items can facilitate user engagement by encouraging a user to expand his or her connections to other users, to invite new users to the system, or to increase interaction with the social networking system by displaying content related to users, objects, activities, or functionalities of the social networking system 200. Examples of social networking content items include suggested connections or suggestions to perform other actions, media provided to or maintained by the social networking system 200 (e.g., pictures or videos), status messages or links posted by users to the social networking system 200, events, groups, pages (e.g., representing an organization or commercial entity), and any other content provided by, or accessible via, the social networking system 200.

The content store 226 also includes one or more pages associated with entities having user profiles in the user profile store 222. An entity is a non-individual user of the social networking system 200, such as a business, a vendor, an organization or a university. A page includes content associated with an entity and instructions for presenting the content to a social networking system 200 user. For example, a page identifies content associated with the entity's user profile as well as information describing how to present the content to users viewing the brand page. Vendors can be associated with pages in the content store 226, allowing social networking system 200 users to more easily interact with the vendor via the social networking system 200. A vendor identifier is associated with a vendor's page, allowing the social networking system 200 to identify the vendor and/or to retrieve additional information about the vendor from the user profile store 222, or from any other suitable source using the vendor identifier. In some embodiments, the content store 226 can also store one or more targeting criteria associated with stored objects and identifying one or more characteristics of a user to which the object is eligible to be presented.

The social networking system 200 can further store data describing one or more connections between different users in the connection store 230. The data describing one or more connections can include a list of connections, a date each connection (i.e., friendship) was made, etc. The connections can be further defined by users, allowing users to specify their relationships with other users. For example, the connections allow users to generate relationships with other users that parallel the users' real-life relationships, such as friends, co-workers, partners, and so forth. In one embodiment, the connection specifies a connection type based on the type of relationship. Examples of the type of relationship include family, friend, colleague, etc. Users can select from predefined types of connections, or define their own connection types as needed. Some or all of this information can also be stored as edge objects in edge store 224.

The action/preferences logger 208 receives communications about user actions on and/or off the social networking system 200, and populates the action/preferences log 210 with data, or information, about those user actions. Such actions can include, for example, adding a connection to another user, sending a message to another user, uploading an image, reading a message from another user, viewing content associated with another user, and attending an event posted by another user.

In some embodiments, the action/preferences logger 208 receives, subject to one or more privacy settings, transaction information from a financial account associated with a user and identifies user actions from the transaction information. For example, the action/preferences logger 208 retrieves vendor identifiers from the financial account's transaction history and identifies an object, such as a page, in the social networking system 200 associated with the vendor identifier. This allows the action/preferences logger 208 to identify a user's purchases of products or services that are associated with a page, or another object, in the content store 226. In addition, a number of actions described in connection with other objects are directed at particular users, so these actions are associated with those users as well. These actions are stored in the action/preferences log 210.

The action/preferences log 210 can be used by the social networking system 200 to track user actions on the social networking system 200, as well as external websites or applications that communicate information to the social networking system 200. Users can interact with various objects on the social networking system 200, including commenting on posts, sharing links, checking-in to physical locations via a mobile device, accessing content items in a sequence, or other interactions. Information describing these actions is stored in the action/preferences log 210. Additional examples of interactions with objects on the social networking system 200 included in the action/preferences log 210 include commenting on a photo album, communications between users, becoming a fan of a musician, adding an event to a calendar, joining a group, becoming a fan of a brand page, creating an event, authorizing an application, using an application, and engaging in a transaction. Additionally, the action/preferences log 210 records a user's interactions with advertisements on the social networking system 200 as well as other applications operating on the social networking system 200.

In some embodiments, data from the action/preferences log 210 is used to infer interests or preferences of the user, augmenting the interests included in the user profile and allowing a more complete understanding of user preferences. These user preferences are further stored in the action/preferences log 210.

The action/preferences log 210 can also store user actions taken on external websites or applications and/or determined from a financial account associated with the user. For example, an e-commerce website that primarily sells sporting equipment at bargain prices can recognize a user of a social networking system 200 through social plug-ins that enable the e-commerce website to identify the user of the social networking system 200. Because users of the social networking system 200 are uniquely identifiable, e-commerce websites, such as this sporting equipment retailer, can use the information about these users as they visit their websites. The action/preferences log 210 records data about these users, including webpage viewing histories, advertisements that were engaged, purchases made and other patterns from shopping and buying. Actions identified by the action/preferences logger 208 from the transaction history of a financial account associated with the user allow the action/preferences log 210 to record further information about additional types of user actions. In some embodiments, content of the action/preferences log 210 can be stored in the database 220 (e.g., user profile store 222).

In some embodiments, the action/preferences logger 208 also receives preferences data, or information, from a home automation device in communication with the social networking system 200 (e.g., the home automation device 120 of FIG. 1), and populates the action/preferences log 210 with the preferences information. The preferences data can include, for example, thermostat preferences (e.g., heating or cooling temperature), lighting preferences (e.g., ambient lighting at night), entertainment preferences (e.g., music, movie, hobbies), and the like. For example, the action/preferences logger 208 receives information about user inputs at the home automation device 120 to adjust a temperature setting (e.g., action to increase the temperature to 75 degrees), and records the action of temperature adjustment as a temperature preference for that user. In some embodiments, the action/preferences logger 208 analyzes the user actions to track and/or infer the user preferences, and further populates the action/preferences log 210 with the analyzed information about those preferences. For example, the action/preferences logger 208 receives and identifies user actions associated with viewing comedy content. This allows the action/preferences logger 208 to infer and record the user's affinity for comedy-related entertainment in the action/preferences log 210, which can later be accessed by the home automation device for controlling one or more home devices in the presence of the user.

The permissions manager 212 manages permission settings associated with a user profile on the social networking system 200. A user of the user profile can login to the social networking system 200 to configure a permission policy for various groups defined by the user. The permission policy can define specific permission settings for specific users or specific hierarchy of users (i.e., different permission levels), e.g., family members, friends, and acquaintances. For example, the user can define users in the "Family" group are on the highest level of a security hierarchy, enabling those users access to a highest amount of applications, tools, and/or content. The particular applications, tools, and/or media content available to a particular group are also configurable by the user. For example, a permission policy can indicate whether a particular user (e.g., a user account of the social networking system) or a particular group (e.g., Family) is allowed to stream a requested media content. Examples of the media content can include images, videos, audio clips, text, scripts, or any combination thereof. Examples of the applications can include entertainment applications (e.g., movie-streaming application or music-streaming application), home security applications (e.g., camera access and control applications), cloud-storage applications, and the like. Examples of the tools can include wireless communication network access.

Figure 3:
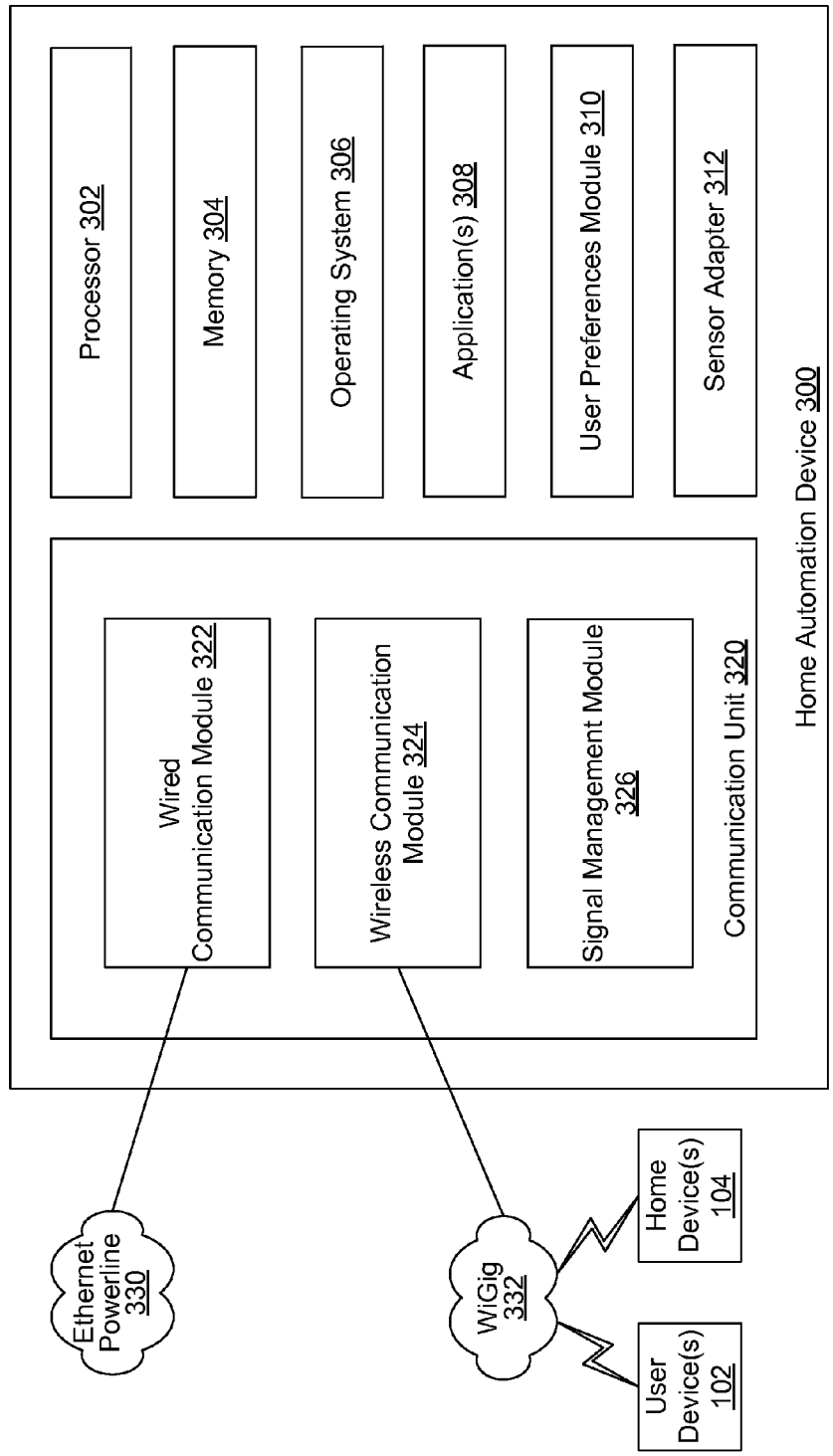
FIG. 3 is a block diagram illustrating components of a home automation device in accordance with some embodiments of the present disclosure.

FIG. 3 is a block diagram illustrating components of a home automation device 300 in accordance with some embodiments of the present disclosure. In some embodiments, the home automation device 300 can be the home automation device 120 of FIG. 1. According to the embodiments shown in FIG. 3, the home automation device includes a processor 302, a memory 304, an operating system 306, one or more applications 308, a user preferences module 310, a sensor adapter 312, and a communication unit 320. In some embodiments, the communication unit 320 includes a wired communication module 322, a wireless communication module 324, and a signal management module 326, all of which are operatively coupled in to one another.

Note in other embodiments, the home automation device 300 can include additional, fewer, or different components, modules, and/or applications. Still yet, some embodiments can incorporate two or more of these modules and components into a single module and/or associate a portion of the functionality of one or more of these modules with a different module. For example, in some embodiments, the wireless communication module 324 and the signal management module 326 can be combined into a single component. In another example, in some embodiments, the wired communication module 322, the wireless communication module 324, and the signal management module 326 can be combined into a single component. In another example, in some embodiments, the wired communication module 322 and the wireless communication module 324 can operate independently of the communication unit 320 (e.g., existing separately from, but working in coordination with, the communication unit 320). In yet another example, in some embodiments, the signal management module 326 and the applications 308 can be combined into a single component.

The memory 304 can be any device, mechanism, or populated data structure used for storing information. In accordance with some embodiments of the present disclosure, the memory 304 can encompass any type of, but is not limited to, volatile memory, nonvolatile memory, and dynamic memory. For example, the memory 304 can be random access memory, one or more memory storage devices, one or more optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, the memory 304 can include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as the memory 304.

The memory 304 can be used to store instructions for running, or executing, one or more applications or modules on processor(s) 210. For example, memory 304 could be used in some embodiments to house all or some of the instructions needed to execute the functionality of the operating system 306, the application(s) 308, the sensor adapter 312, the wired communication module 322, the wireless communication module 324, and the signal management module 326.

The operating system 306 can provide a software package that is capable of managing the hardware resources of the home automation device 300. The operating system 306 can also provide common services for software applications running, or executing, on the processor 302. The operating system 306 can include mobile operating systems, such as IOS® or ANDROID™, or more conventional operating systems, such as LINUX® or WINDOWS®.

In accordance with various embodiments, the operating system 306 can coordinate resources for the application(s) 308 that allow a user to access and interact with service providers. The service providers can be, for example, a video-streaming service, a music-streaming service, a security system service, a shopping service, etc. The application(s) 308 can include, for example, a home automation application, a social networking application, a home security application, a video-streaming application, an audio application, a gaming application, and the like. The application(s) 308 can access a server associated with the service providers to retrieve and/or access account details. Generally, a user of a particular application 308, such as the home automation application, has to authenticate herself with a particular service provider before gaining access. Traditionally, the authentication process can be cumbersome, requiring a username and password be entered by the user for accessing every service provider, and in particular for accessing a home automation system service account.

In contrast, various embodiments of the present disclosure provides for a social-profile based home automation system that uses an individual's user profile associated with a social networking system (e.g., the social networking system 110) to provide authentication to various services and control of various home devices to access those services. In accordance with some embodiments of the present disclosure, once the individual, or user, authenticates herself with the social networking system (e.g., by inputting, via a user interface of the home automation device 300, login credentials (e.g., username and password) associated with the social networking system 110), the home automation device 300 can automatically control the home devices and any associated service provider accounts based on that user profile. Accordingly, authentication with the social networking system enables authentication at all other service providers linked to the social networking service, where the user has created accounts at the other service providers using, e.g., a social user profile associated with the social networking system 110. For example, once authenticated, the home automation device 300 can interact with a music-streaming service provider to control a music-streaming device (e.g., iPod®) based on music preferences extracted from the user profile at the social networking system.

In some embodiments, the application(s) 308 are coupled with the sensor adapter 312 to interact with various "add-on" electronic sensor components ("add-on sensors"). The add-on sensors can be physically coupled to the home automation device, for example, through electrical connection slots (e.g., connectors 706 of FIG. 7). Examples of such add-on sensors can include carbon monoxide detectors, smoke detectors, security cameras, or voice recognition detectors. The sensor adapter 312 provides an interface for communication between the home automation device 300 and one or more add-on sensors, using circuitry and protocols such as those for handling data, audio, video interface, wireless transceivers, or the like (e.g., Bluetooth, IEEE 1394a-b, serial, universal serial bus (USB), Digital Visual Interface (DVI), 802.11a/b/g/n/x/ad, cellular, etc.). In other embodiments, the sensor adapter 312 can include components, modules, and/or applications for communicating with other types of add-on electronic components and/or devices. For example, these other add-on electronic components and/or devices can include a speaker component utilized for communicating with an audio system and/or speaker, or can be the speaker itself for transmitting audio.

The user preferences module 310 can be running or executing on the home automation device 300. The user preferences module 310 is coupled to the processor and configured to store user profile data associated with users of the social networking system. In some embodiments, the user preferences module works in coordination with the one or more applications 208. For example, upon authentication, user profile data of a particular user is transmitted to the home automation device 300 via the applications 208. In the example, the applications 208 forwards the data to the user preferences module 310 for storage. In some embodiments, the user preferences module 310 works in coordination with the communication unit 320 to receive the user profile data for storage.

The communication unit 320 facilitates communication between the home automation device 300 and remote devices and/or systems, such as one or more other home automation devices (e.g., home automation devices 120B-N), one or more home devices 108, or the social networking system. In accordance with some embodiments of the present disclosure, the communication unit 320 includes the wired communication module 322 for receiving and transmitting data/information via a wired communication link. In some embodiments, the wired communication module 322 is a powerline adapter (or Ethernet powerline adapter) that receives and transmits data using an Ethernet communication link via a powerline ("Ethernet Powerline Connection 330"). Utilization of the wired communication module 322 advantageously provides for a high-speed wired network connection within a home through use of the home's electrical power wiring.

In accordance with some embodiments of the present disclosure, the wired communication module 322 is operatively coupled to the wireless communication module 324 to advantageously provide for the receiving and transmitting of data/information via a high-speed wireless network connection within the home. In some embodiments, the wireless communication module 324 is a Wireless-Gigabit (WiGig) adapter that is configured to provide a short-range wireless communication link 332 at a multi-gigabit per second (MGBps) rate. For example, the home automation device 300, through the wireless communication module 324, can provide the wireless communication link 332 to the devices 102, 104 for communication and/or communicate via the link 332 with the user devices 102 and the home devices 104. As used herein, the "short-range" refers to a specified range, or distance, that is relatively "short" in comparison to that of conventional Wi-Fi signals. In contrast to Wi-Fi signals, however, the short-range signal via the wireless communication link of the wireless communication module 324 is broadcast at a multi-gigabit per second rate. The specified range can be, in some embodiments, a distance of 30 feet or less. In some embodiments, this range can be reconfigured by a user or an operator of the home automation device 300. Accordingly, the wireless communication module 324, coupled to the wired communication module 322, provides a high-speed wireless networking connection for other devices operating within a specified range of the home automation device 300, thereby containing the signal within boundaries of a home (e.g., a particular room) and preventing unnecessary penetration into other areas (e.g., other rooms) and/or signal leakage to the outside of the home.

The signal management module 326 is configured to detect, within the specified range, a high-speed wireless communication signal that is broadcast by another home automation device, such as home automation device 120B. The high-speed wireless communication signal can be a signal broadcast via a WiGig link, or any other wireless communication link at a MGbps rate. The signal management module 326 is further configured to transmit, in response to detecting the high-speed wireless communication signal, a power-down message to that other home automation device. The power-down message can include a request (e.g., instructions) for the other home automation device to power down, or decrease, its wireless communication signal, thereby preventing that signal from penetrating the space being occupied by the home automation device 300.

In some embodiments, the home automation device 300, using the wireless communication module 324, can detect a physical presence of a user within a home via the wireless communication connection 332. In particular, the wireless communication module 324 is configured to monitor, within the specified range within a home, for any signal being broadcast via the wireless communication connection 332 by an electronic device, such as the user device 102 of FIG. 1. Upon such detection, the wireless communication module 324 transmits the information to the processor 302, which determines an identity of the user of that user device 102, and more particularly, a user profile of the user associated with a social networking system. Based on the determined identity of the user, the wireless communication module 324 can communicate with one or more home devices 104 to control those home devices 104 in accordance with the preferences associated with the user profile.

In some embodiments, the wired communication module 322 can include a system-on-chip (SoC) chipset (not shown) that carry out the functionalities of the wired communication module 322, the wireless communication module 324, and/or the signal management module 326. The SoC chipset can be part of a core processing or computing unit of the communication unit 320, and is configured to receive and process input data and instructions, provide output and/or control other components of the communication unit 320 in accordance with various embodiments of the present disclosure. The SoC chipset can include a microprocessor, a memory controller, a memory and other components. The microprocessor may further include a cache memory (e.g., SRAM), which along with the memory of the SoC chipset can be part of a memory hierarchy to store instructions and data. The microprocessor may also include one or more logic modules such as a field programmable gate array (FPGA) or other logic array. Communication between The SoC chipset's microprocessor and memory can be facilitated by the memory controller (or chipset), which can also facilitate communication with the peripheral components.

In other embodiments, each of the wired communication module 322, the wireless communication module 324, and/or the signal management module 326 can have its own respective SoC chipset. In some embodiments, the communication unit 320 can also include a bus infrastructure and/or other interconnection means to connect and communicate information with the other components of the communication unit 320 and/or of the home automation device 300.

Figure 4:
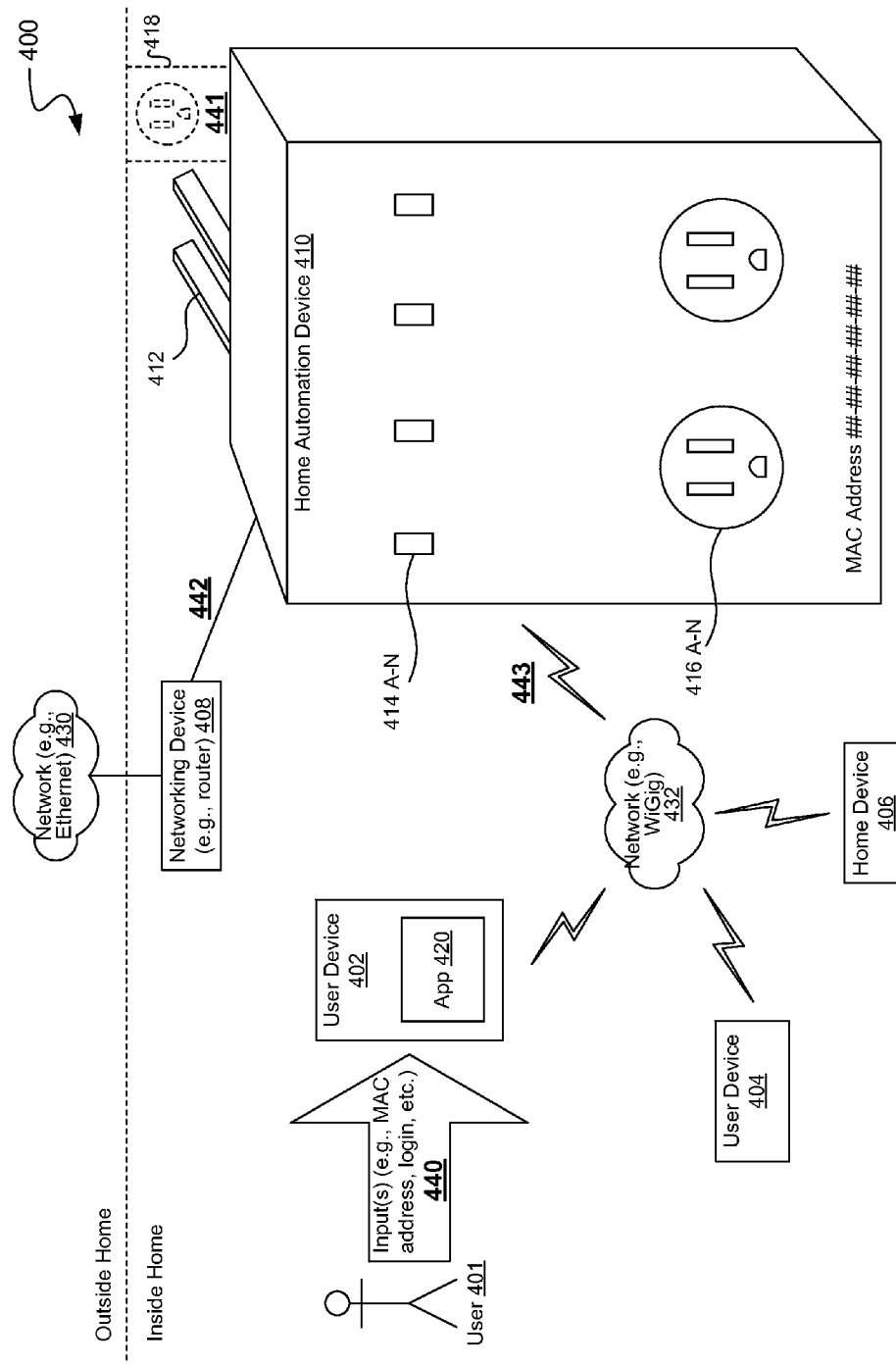
FIG. 4 is a diagram illustrating a process flow for setting up a home automation device in accordance with some embodiments of the present disclosure.

FIG. 4 is a diagram illustrating a process flow 400 for setting up a home automation device 410 in accordance with some embodiments of the present disclosure. In some embodiments, the home automation device 410 can be an embodiment of the home automation device 120 of FIG. 1 or the home automation device 300 of FIG. 3. In accordance to the embodiments of FIG. 4, the process flow 400 includes operations 440, 441, 442, and 443.

Through the process flow 400, a user 401 can set up the home automation device 410 using a user device 402 and a networking device 408. In some embodiments, the networking device 408 is a conventional router that forwards, or routes, data packets between computer networks. In such embodiments, the networking device 408 can be utilized to route data to/from a wired communication network and a wireless communication network provided by the home automation device. The wireless communication network can include a short-range, multi-gigabit per second communication link (e.g., a WiGig link).

As illustrated in the embodiments of FIG. 4, the home automation device 410 can be embodied as an electronic unit physically capable of being plugged into an electrical outlet 418 of a home. In some embodiments, the home automation device 410 includes one or more bypass electrical outlets 416 A-N (where A is 1 and N is an integer greater than 1) to provide more electrical outlets for use in the home. In some embodiments, the home automation device 410 includes one or more connectivity ports 414 A-N (where A is 1 and N is an integer greater than 1). The connectivity ports 414 A-N enables the physical attachment of one or more add-on electronic components to the home automation device 410. For example, the add-on electronic components can be one or more light-weight devices that can be added onto the network of home devices in communication with the home automation device 410 ("add-on home devices"). Example add-on home devices can include a high-fidelity speaker, a WiFi® video streaming camera, or one or more sensors. Example sensors can include a carbon-monoxide detector, a smoke detector, etc.

In some embodiments, the add-on home devices can connect to the connectivity ports 414 A-N by use of magnetism. In such embodiments, a particular connectivity port 414A can include a connectivity pad (not shown) that is internal (i.e., underneath the surface of the home automation device 410); the connectivity pad can have one or more rare earth magnets for providing connectivity with other magnets positioned (externally) next to the particular connectivity port 414A. A particular add-on home device can also include a connectivity portion that has one or more rare earth magnets for connecting to the particular connectivity port 414A. The magnets of both devices enable adhesion of the particular add-on home device to the particular connectivity port 414A upon contact, thereby holding the add-on home device physically in place at a particular position on the home automation device 410.

In some embodiments, the home automation device 410 can include one or more USB ports that provide power to the add-on home devices attached through the connectivity ports 414 A-N. In such embodiments, an add-on home device can be physically held in place by a connectivity port (e.g., the connectivity port 414A) and be provided power through connection to a USB port corresponding to the connectivity port 414A.

The user device 402 can be the user device 102 described in FIG. 1. An application 420 ("App 420") is running, or executing, on the user device 402, and is configured to enable the user 401 to set up the home automation device 410. In some embodiments, the App 420 is associated with a social networking system (e.g., the social networking system 110 of FIG. 1). As illustrated in operation 440, the user 401 launches the App 420 executing on the user device 402. The user 401 enters one or more inputs into the App 420 to associate the home automation device 410 with the App 420. The user 401 can enter login credentials associated with a user account of the user 401, where that user account is associated with the App 420 (e.g., a social profile user account on the social networking system). The user 401 can next enter a MAC address (e.g., a unique identifier including six groups of two hexadecimal digits) of the home automation device 410 to identify that device to the App 420, and, in turn, to the social networking system. Once the App 420 is connected to the home automation device 410, the App 420 can facilitate communication of user profile data of the user 401 to the home automation device 410. The home automation device 410 can utilize the user profile data to control various home devices (e.g., home devices 104 of FIG. 1) and/or add-on home devices (e.g., as discussed above) in accordance with the defined preferences and/or predicted preferences of the user 401.

At operation 441, the user 401 plugs the home automation device 410 into the electrical outlet 418. At operation 442, the user 401 connects the home automation device 410 to the networking device 408. The networking device 408 enables the home automation device 410 to be connected to a wired communication network 430 (e.g., Ethernet). Furthermore, connection to the electrical outlet 418 and the networking device 408 enables the home automation device 410 to facilitate network communication of data using the Ethernet connection link via powerline.

At operation 443, the home automation device 410 broadcasts a multi-gigabit per second (MGbps) communication signal, or link, for use by any electronic devices and/or apparatuses within a specified range of the home automation device 410. The specified range is a relatively short range as compared to a typical WiFi® signal. In some embodiments, the specified range can be, for example, 30 feet or less. In the embodiments of FIG. 4, the multi-gigabit per second communication link is a low frequency communication signal that enables the home automation device 410 to limit the broadcasting of the signal to the specified range. That is, the home automation device 410 is able to provide a short-range, high data rate signal that can provide dependable connectivity to devices in the surrounding vicinity. As a result of the setup by the user 401, any electronic device, such as the user device 402, another new user device 404, and a home device 406, can operate using the short-range, yet high-speed communication link provided by the home automation device 410.

In some embodiments, the user 401 can access the App 420 to configure various settings that can be utilized by the home automation device 410, where those settings can include preferences and permissions. For example, the user 401 can set up temperature preference and lighting preference in the home. In some embodiments, the user 401 can access the App 420 to configure permissions settings that can be utilized by the home automation device 410. In some embodiments, the permission settings can be used to control one or more home devices or add-on home devices.

In some embodiments, the permission settings can be used to control specific applications, tools, and/or content associated with or provided by the one or more home devices and/or add-on home devices. In one example, the user 401 can set up Internet access permissions for various other users (e.g., guests to the home) so that those users can have automatic access to the Internet on their devices the moment they enter the home, without having to request for an access password from the user 401.

The permission settings can include a hierarchy of users as defined by the user 401. The hierarchy of users can identify particular users that belong in a particular level of trust within the hierarchy indicated by the user 401. For example, the user 401 can define 3 levels of trust within the hierarchy including a "Family Group" as a first level (or highest level) of trust, a "Friends Group" as a second level (or middle level) of trust, and an "Acquaintances Group" as a third level (or lowest level) of trust. Within each level, the user 401 can identify users that belong to that level. The user 401 can also define specific permissions given to those users in the different groups. For example, within the "Family Group," the user 401 can enter two names (or usernames on the social networking system) and associate the labels "wife" and "daughter" to those names. In this example, the user 401 can define that permissions for everything are granted to those users in the "Family Group." In another example, within the "Friends Group," the user 401 enters a list of names and associate the label "friend" to those names. In this example, the user 401 can define that only permissions to certain things are granted to those users, such as access to WiFi connection, access to certain photo albums, etc. In another example, within the "Acquaintances Group," the user 401 enters a list of names and associate the label "acquaintance" to those names. In this example, the user 401 can define that only permissions to certain things are granted to those users, such as access to WiFi connection. The user 401 can also specify that no permission is given to any user not listed in any of the "Friends Group," the "Family Group," or the "Acquaintances Group."

In some embodiments, the permission settings can be further configured for subgroups within each level of the hierarchy defined by the user 401. For example, within the "Family Group," the user 401 can restrict access to certain applications and/or content associated with the applications (e.g., streaming of R-rated movies unavailable to "daughter"

user). In some embodiments, the permission settings can be further configured to define priority of preferences for users within each level of the hierarchy defined by the user 401. For example, within the "Family Group," the user 401 can specify that preferences of a user with the "wife" label has priority over the user with the "daughter" label and/or the "husband" label.

In some embodiments, the user 401 can submit additional inputs to configure various settings associated with the home automation device 410. In some embodiments, the additional inputs can be submitted through the App 420 running on the user device 402. In some embodiments, the additional inputs can be submitted using a different application or customized client associated with the home automation device 410. For example, the user 401 accesses an application running on the home automation device 410 to submit the additional inputs. In this example, the home automation device 410 can include, for example, a display that generates one or more graphical user interfaces to enable the user 401 to interact and configure the various settings associated with the home automation device 410. In another example, the user 410 accesses a browser application running on the user device 402 to configure the various settings associated with the home automation device 410.

Figure 5:
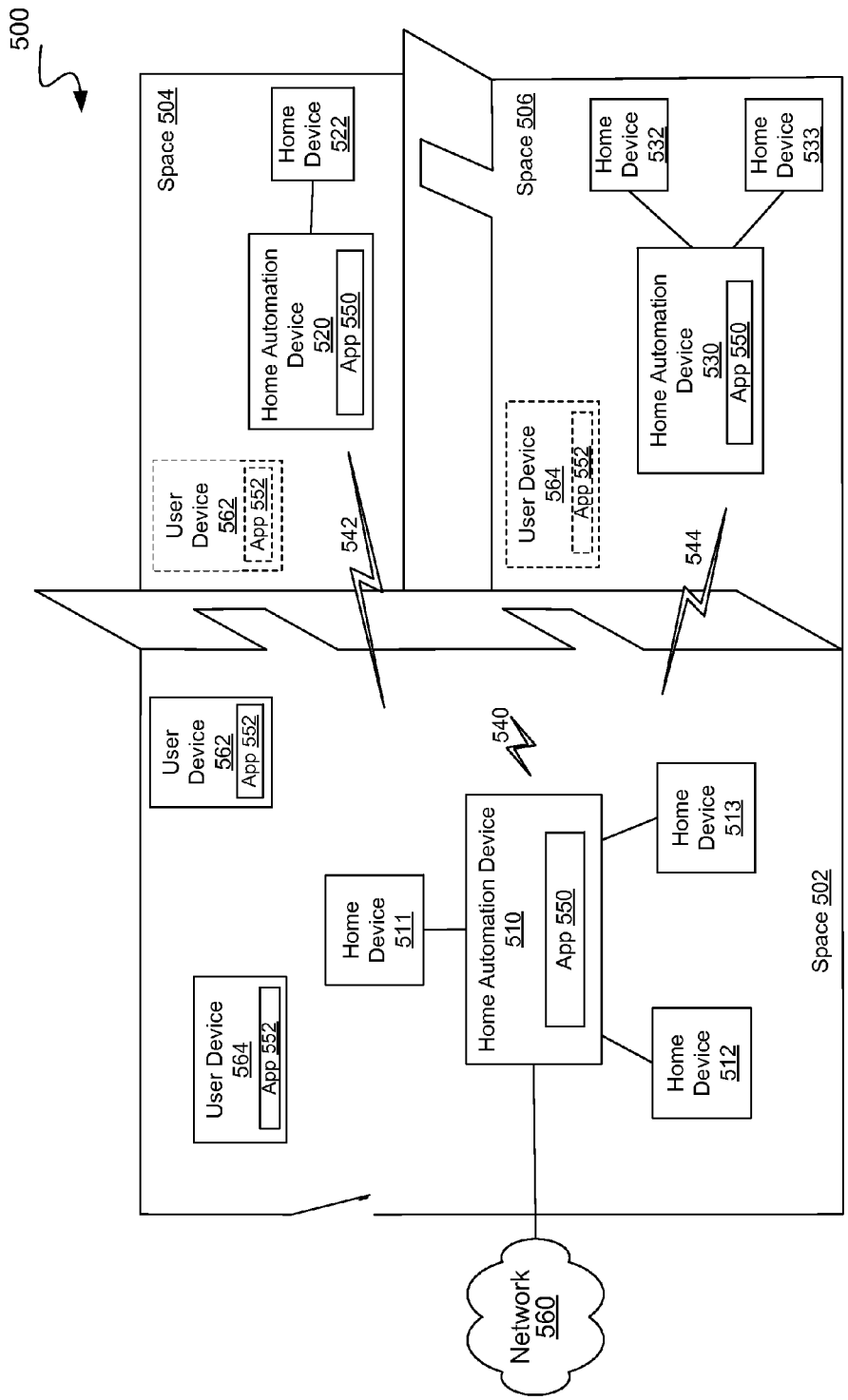
FIG. 5 is a diagram illustrating an example home environment in which various embodiments of the home automation system can be utilized.

FIG. 5 is a diagram illustrating an example home environment 500 in which various embodiments of the home automation system can be utilized. As illustrated in the embodiments of FIG. 5, the example home environment 500 includes three different spaces 502, 504, and 506, where each space can be representative of a room within a home. In accordance with some embodiments, the space 502 includes a first home automation device 510 in communication with a home device 511, a home device 512, and a home device 513. In accordance with some embodiments, the space 504 includes a second home automation device 520 and a home device 522. In accordance with some embodiments, the space 506 includes a third home automation device 530, a home device 532, and a home device 534.

In some embodiments, the first home automation device 510 is in communication with the home devices 511, 512, and 513 via a short-range multi-gigabit per second communication link, such as a WiGig link. The first home automation device 510 is configured to transmit information via a network 560 via a wired communication link, such as an Ethernet connection. In some embodiments, the Ethernet connection is implemented using an Ethernet powerline adapter. In some embodiments, the home automation device 510 is configured to broadcast the short-range multi-gigabit per second communication link to one or more user devices to enable communication via the network 560. In such embodiments, the one or more user devices can transmit and/or receive information via the network 560 using the short-range multi-gigabit per second communication link provided by the home automation device 510. For example, a particular user device can browse and access content of an online website. In another example, the particular user device can stream movies at a high speed using the communication link provided by the home automation device 510.

An application 550 is running or executing on the home automation device 510. A user, e.g., a home owner of the home, can launch the application 550 to set up the home automation device 510. For example, the user can enter login credentials to authenticate the user with a social networking system and access various services provided through the social networking system, such as automated control of home devices within the home. In one example, the user can set up temperature preference and lighting preference in the home. In another example, the user can set up Internet access permissions for various other users so that those users can have automatic access to the Internet on their devices the moment they enter the home, without having to request for an access password from the user.

In some embodiments, once the user has authenticated himself/herself via the social networking system, the application 550 can access a user profile of the user on the social networking system to control the home devices 511, 512, 513 in accordance with predicted preferences and/or predefined preferences of the user. In some embodiments, the home automation device 510 can be authorized to access other accounts of the user based on the authentication with the social networking system, and can automatically access various application and/or services on behalf of the user. For example, the home automation device 510 can communicate with a movie streaming stream service to access movie content using the user's movie-streaming service account based on the authentication with the social network system. The home automation device can further select, based on the user's social networking user profile, a movie for streaming to the user on a home television that is wireless-connected to the home automation device 510 via the communication link 540.

Each of the home automation device 510, 520, and 530 is configured to provide a short-range multi-gigabit per second link for utilization by devices within a predefined, or specified, range of the device (e.g., the home devices and/or the user devices 562, 564). The predefined range can be, for example, a 30-foot radius. In some embodiments, the short-range multi-gigabit per second link is configured to propagate through air, but not penetrate building structures (e.g., walls). In such embodiments, the link provides a high-speed network connection without penetrating beyond its predefined limits, such as the safe boundaries of the home.

In the various embodiments of FIG. 5, the home automation device 510 is configured to control the home devices 511, 512, 513 based on a detection of one or more user devices within the space 502, where the one or more user devices belong to one or more users of the home. The home devices 511, 512, and 513 can be various "smart" devices used for the home with wired and/or wireless communication capabilities. The home device 511 can be, for example, a wired or wirelessly connected thermostat. The home device 512 can be, for example, a wired or wirelessly connected light bulb and/or a wired or wirelessly connected lighting system. The home device 513 can be a wired or wirelessly connected audio/video system (e.g., an entertainment center including a television and a speaker system). Other example home devices can include a smoke detector, a carbon monoxide detector, a security system, and other sensor systems. The home automation device 510 can communicate with any of these detectors/sensors to monitor the home environment and ensure safety of users within the environment (e.g., by alerting).

In particular, the home automation device 510 can communicate with a particular sensor periodically (e.g., every second, minute, hour, etc.), receive sensor data outputs detected by these sensors, determine that a value of a sensor output is within a specified threshold range, detect that a particular signal from a particular user mobile device of a particular user within the specified range (where the particular signal indicates that the particular user is physically present within the specified range), and transmit a notification to the particular user mobile device to alert the particular user of the sensor output value being within the specified threshold range. The specified threshold range here refers to a specified range of values associated with levels that are no longer safe, or at least concerning, to the user. In one example, the home automation device 510, through communication with a carbon monoxide detector, receives and determines a level of carbon monoxide is at or exceeds a threshold (i.e., within specified threshold range). In addition to this determination, the home automation device 510 also detects a particular signal from a particular user mobile device of a particular user (i.e., indicating a physical presence of the particular user within the specified range). In response, the home automation device 510 can transmit, via the short-range wireless communication link, a notification to the particular user mobile device to alert the particular user of the level of carbon monoxide exceeding the threshold.

The second home automation device 520 and the third automation device 530 are configured to perform similar functionalities as discussed above with respect to the first home automation device 510. The home device 522 and the home devices 532 and 533 are similar to the home devices 511, 512, and 513 in that they are home devices capable of communicating via a wired and/or a wireless communication network. Consider now the following example scenarios, for ease of discussion and not limiting, involving the various home automation devices 510, 520, and 530 and the various home devices 522, 532, 533 operating in the spaces 502, 504, and 506.

In a first example scenario, a first user, e.g., a husband owner of the home, enters the space 502 carrying a first user device 562. An application 552 is executing on the first user device 562. The application 552 ("App 552") can be a social networking application associated with a social networking system (e.g., the social networking system 110 of FIG. 1.) The first user authenticates (or has already authenticated) himself by entering, into the App 552, login credentials for his social networking account associated with the social networking system. The home automation device 510 detects a signal from the first user device 562. In some embodiments, the signal can be transmitted via the communication link 540 provided by the first home automation device 510 (e.g., a WiGig link). In some embodiments, the signal can be sent by the App 552. For example, the App 552 is configured to broadcast the signal continuously in the background of the first user device 562 to connect with any home automation device within the vicinity of the first user device 562.

The first home automation device 510 determines the identity of the first user carrying the first user device 562 based on the received signal. In particular, the first home automation device 510 can derive user profile information, such as a user ID, from the signal received. In some embodiments, the home automation device 510 further determines other information about the user (or "user profile data") based on the signal. The first home automation device 510 can send a request for that other information to the social networking system. Upon receiving the user profile data, the home automation device 510 can automatically transmit a message to one or more home devices, such as the home device 511, to control that device in accordance with that information. For example, the first home automation device 510 receives a temperature preference of the first user (e.g., 68 degrees), and in response, transmits a message to adjust the home device 513, which is a thermostat in the example, to operate at that temperature for the first user.

Next in the first scenario, a second user, e.g., a wife owner of the home, enters the space 502 carrying a second user device 564. The App 552 is executing on the second user device 564. The second user, similar to the first user, authenticates (or has already authenticated) herself by entering, into the App 552, login credentials indicative of her social networking account associated with the social networking system. The first home automation device 510 detects a signal from the second user device 564. In some embodiments, the signal can be transmitted via the communication link 540 provided by the first home automation device 510 (e.g., a WiGig link). In some embodiments, the signal can be sent by the App 552 executing on the second user device 564.

Based on the received signal, the first home automation device 510 determines the identity of the second user carrying the second user device 564 by deriving user profile information, such as a user ID, from the received signal. In some embodiments, the first home automation device 510 further determines other information about the user (or "user profile data") based on that signal. The first home automation device 510 can send a request for that other information to the social networking system. Upon receiving the user profile data, the home automation device 510 can automatically transmit a message to one or more home devices, such as the home device 513, to control that device in accordance with that information. For example, the first home automation device 510 receives a temperature preference of the second user (e.g., 76 degrees), in addition to information that the second user (e.g., the wife owner) has priority over the first user (e.g., the husband owner) in terms of temperature preferences. In response, the first home automation device 510 can transmit a message to adjust the thermostat (e.g., home device 513) to the new temperature preferred by the second owner.

In some embodiments, the preference priority can be configured in a permissions profile or settings associated with the first user. In some embodiments, the preference priority can be configured in a permissions profile or settings associated with the second user. For example, the first user connects to the second user via the social networking system and specifies in his user profile that the preferences of particular users (e.g., the second user) have priority over his preferences.

In a second example scenario, the first user carrying the first user device 562 enters the space 504 that contains the second home automation device 520. The second home automation device 520 detects a signal from the first user device 562.

The signal can be transmitted via the communication link 542 provided by the second home automation device 520 (e.g., a WiGig link). In some embodiments, the signal can be sent by the App 552 executing on the first user device 562. The second home automation device 520 determines the identity of the first user carrying the first user device 562 based on the received signal.

Similar to the first home automation device 510, the second home automation device 520 can automatically transmit a message to one or more home devices, such as the home device 522, to control that device in accordance with user profile data of the first user. In one example, the home device 522 is a thermostat configured to control temperature within the space 504. In such example, the second home automation device 520 transmits a message to control the home device 522 so that the space 504 is operating at the preferred temperature of the first user (if not already). In another example, the home device 522 is a lighting system of one or more lights installed in the space 504 to provide lighting coverage. In such example, the second home automation device 520 transmits a message to control the home device 522 in accordance with the first user's lighting preference (e.g., bright between the hours of 4 PM and 9 PM).

In a third example scenario, the second user carrying the second user device 564 enters the space 506 that contains the third home automation device 530. The third home automation device 530 detects a signal from the second user device 564. The signal can be transmitted via the communication link 544 provided by the third home automation device 530 (e.g., a WiGig link). In some embodiments, the signal can be sent by the App 552 executing on the second user device 564. The third home automation device 530 determines the identity of the second user carrying the second user device 564 based on the received signal.

Similar to the first home automation device 510, the third home automation device 530 can automatically transmit a message to one or more home devices, such as the home device 532 and 533, to control those devices in accordance with user profile data of the second user. In one example, the home device 532 is a stereo system configured to play music within the space 506, where the music is provided by an online music-streaming service provider. In such example, the third home automation device 530 transmits a message to control the home device 532 so that it starts streaming music from a radio station configured based on a favorite artist defined and/or predicted based on the user profile data of the second user. In another example, the home device 533 is a lighting system of one or more lights installed in the space 506 to provide lighting coverage. In such example, the third home automation device 530 transmits a message to control the home device 533 in accordance with the second user's lighting preference (e.g., ambient after 7 PM).

Other examples of auto-control of the home devices, other than those discussed above, can be implemented using the various embodiments of the home automation devices 510, 520, and 530 discussed in FIG. 5. For example, the first home automation device 510 can control lighting of a wirelessly connected lighting system of the space 502 (e.g., home device 512) upon entrance of the first user (e.g., in response to a detection of the second user device 564).

In some embodiments, the home automation devices 510, 520, and 530 are configured to manage signal broadcasting between one another. Such functionality is beneficial, for example, to help home users manage signal strength, thereby resulting in energy efficiency (due to management of power utilized by the devices 510, 520, 530). Furthermore, such management helps reduce the security risks of outsiders taking advantage of the wireless signal within the home (e.g., unauthorized network access).

In some embodiments, each of the home automation devices 510, 520, 530 is configured to monitor its respective vicinity for the over-broadcasting of any signal beyond the predefined range, thereby supporting energy efficiency. In an example scenario, the first home automation device 510 is configured to provide the communication link 540 within a predefined range, or distance (e.g., within the space 502), the second home automation device 520 is configured to provide the communication link 542 within its predefined range (e.g., within the space 504), and the third home automation device 530 is configured to provide the communication link 544 within its predefined range (e.g., within the space 506). The predefined range can be, for example, a 30 foot radius.

In some embodiments, the first home automation device 510 can monitor the space 502 and detect the communication link 542 being broadcast from the second home automation device 520. In some embodiments, the first home automation device 510 can analyze a strength of the detected communication link 542. If the signal strength is beyond a specified threshold, the first home automation device 510 can transmit a message to the second home automation device 520 to power down, or decrease the signal strength (e.g., decrease magnitude of signal strength). In some embodiments, the first home automation device 510 simply transmits the message to power down in response to detection of the communication link 542 within the space 502. Similarly, the first home automation device 510 can monitor the space 502 and detect the communication link 544 being broadcast from the third home automation device 530. In response to such detection, the first home automation device 510 can transmit a power-down message to the third home automation device 530.

In some embodiments, the second home automation device 520 can monitor the space 504 and detect for any communication link invading the space 504. For example, the second home automation device 520 detects the communication link 544 being broadcast from the third home automation device 520. In some embodiments, the second home automation device 520 can analyze a strength of the detected communication link 544. If the signal strength is beyond a specified threshold, the second home automation device 520 can transmit a message to the third home automation device 530 to power down, or decrease the signal strength (e.g., decrease by a particular magnitude). In some embodiments, the second home automation device 520 simply transmits the message to power down in response to detection of the communication link 544 within the space 504. Similarly, the second home automation device 520 can monitor the space 504 and detect the communication link 540 being broadcast from the first home automation device 510. In response to such detection, the second home automation device 520 can transmit a power-down message to the first home automation device 510.

In some embodiments, the third home automation device 530 can perform the monitoring functionality of the first and second home automation devices 510, 520 for the space 506. Upon detection of any of the communication links 540 or 542, for example, the third home automation device 530 transmits the message to power down to the corresponding home automation device in response to detection of that home automation device's communication link within the space 506. In some embodiments, the third home automation device 530 can analyze a strength of the detected communication link, and transmit the power-down message if the signal strength is beyond a specified threshold.

In various embodiments, the home automation devices 510, 520, and 530 are operatively coupled to one another to enable continuous connectivity and/or operation of user devices for users within the home. In one example, the home automation devices work in coordination to provide continuous wireless networking access when the first user device 562 moves from the space 502 to the space 504. In another example, the home automation devices 510, 520, and 530 provide continuous wireless communication access when the first user device 562 moves from the space 502 to the space 504 and/or the space 506. In another example, the home automation devices 510, 520, and 530 work in coordination to provide a user with continuous access to music provided by an online streaming service provider when the user moves between the space 502 and the space 504. In this example, the home automation devices 510 and 520 communicate with each other, via the wired communication network (e.g., Ethernet powerline system), to control a wirelessly connected audio system located in the space 502

(e.g., home device 513) and a wirelessly connected audio system located in the space 504 (e.g., home device 522).

Figure 6:
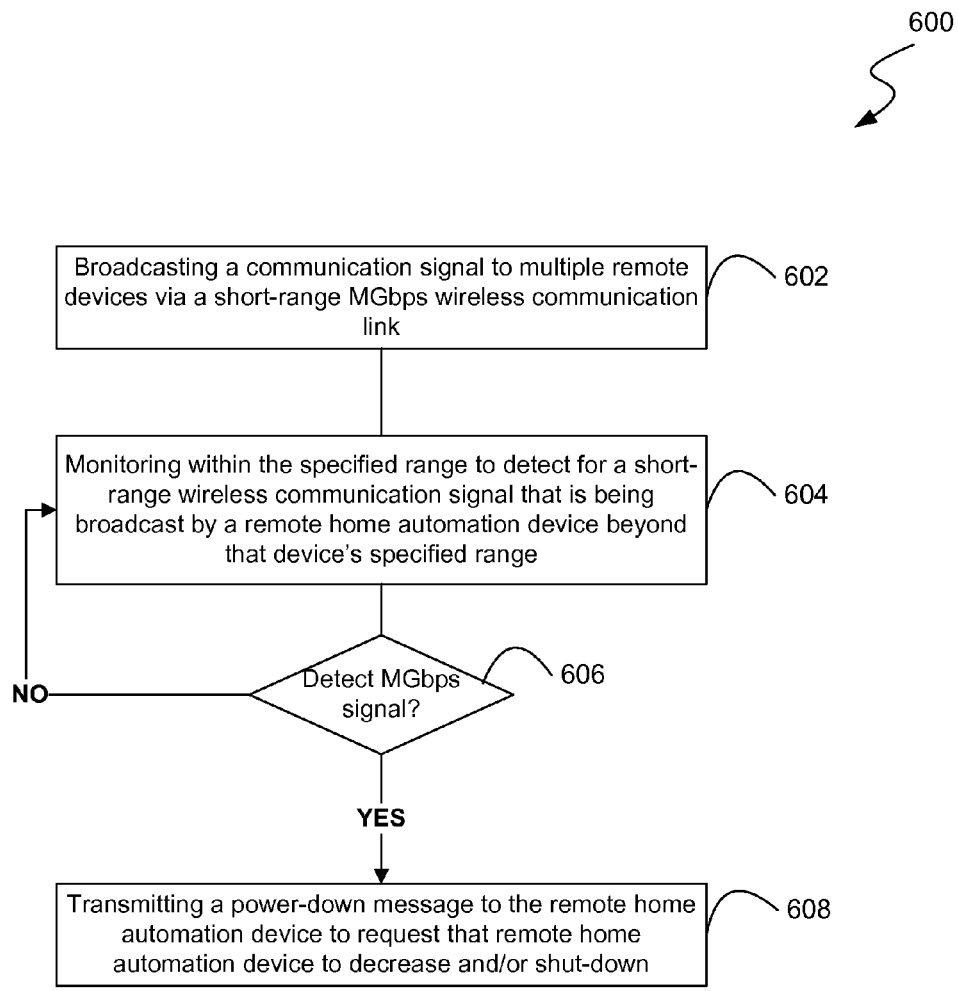
FIG. 6 is a flow chart of a method of managing a communication signal of a home automation system in accordance with various embodiments of the present disclosure.

FIG. 6 is a flow chart of a method 600 of managing a communication signal of a home automation system in accordance with various embodiments of the present disclosure. In some embodiments, the method 600 can be implemented by a home automation device (e.g., home automation device 120 of FIG. 1). At block 602, the device broadcasts a communication signal to multiple remote devices via a short-range MGbps wireless communication link, where the link is broadcast within a specified range that is relatively short as compared to a typical WiFi® signal.

At block 604, the device monitors within the specified range to detect for another wireless communication signal being broadcast at the MGbps rate by a remote home automation device. At block 606, the device determines whether a MGbps signal has been detected. If such a signal is detected, the device proceeds to block 608. At block 608, the device transmits a power-down message to the remote home automation device from which the device has detected the MGbps signal. If no such signal is detected, the device returns to block 604 and continues to monitor the specified range.

Figure 7:
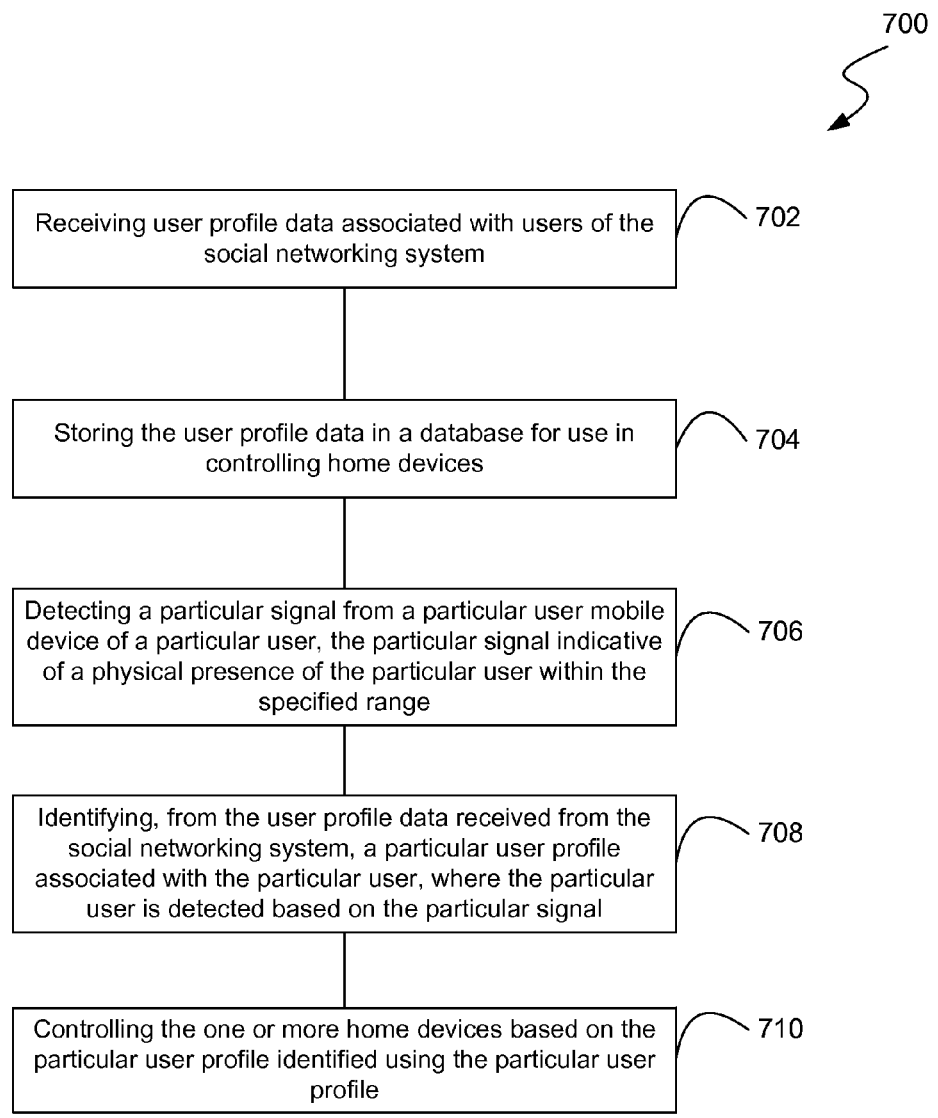
FIG. 7 is a flow chart of a method of controlling home devices of a home automation system in accordance with various embodiments of the present disclosure.

FIG. 7 is a flow chart of a method 700 of controlling home devices of a home automation system in accordance with various embodiments of the present disclosure. In some embodiments, the method 700 can be implemented by a home automation device (e.g., the home automation device 120 of FIG. 1).

At operation 702, the device receives user profile data associated with users of the social networking system. At operation 704, the device stores the user profile data associated with the users of the social networking system. In some embodiments, the device sends a request for user profile data after detection of a user device associated with a user of the social networking system.

At operation 706, the device detects a particular signal from a particular user mobile device of a particular user, the particular signal indicative of a physical presence of the particular user within the specified range. In some embodiments, the particular signal can include identifying information about the particular user (e.g., username, device ID, application ID, IP address, etc.). At operation 708, the device identifies, from the user profile data received from the social networking system, a particular user profile associated with the particular user detected based on the particular signal. For example, the device derives identifying information from data included in the particular signal and identifies the particular user profile associated with that identifying information.

At operation 710, the device controls one or more home devices based on the particular user profile identified. For example, the device communicates via a short-range, MGbps communication link to transmit a command message that controls a thermostat to be at a particular temperature specified by the temperature preference of the particular user profile identified. In yet another example, the device provides the particular user mobile device access to the MGbps wireless networking connection without prompting the particular user for a password, based on the particular user profile being included in a home user's permissions settings.

Regarding the methods 600 and 700, while the various steps, blocks or sub-processes are presented in a given order, alternative embodiments can perform routines having steps, or employ systems having steps, blocks or sub-processes, in a different order, and some steps, sub-processes or blocks can be deleted, moved, added, subdivided, combined, and/or modified to provide alternative or sub-combinations. Each of these steps, blocks or sub-processes can be implemented in a variety of different ways. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges.

Figure 8:
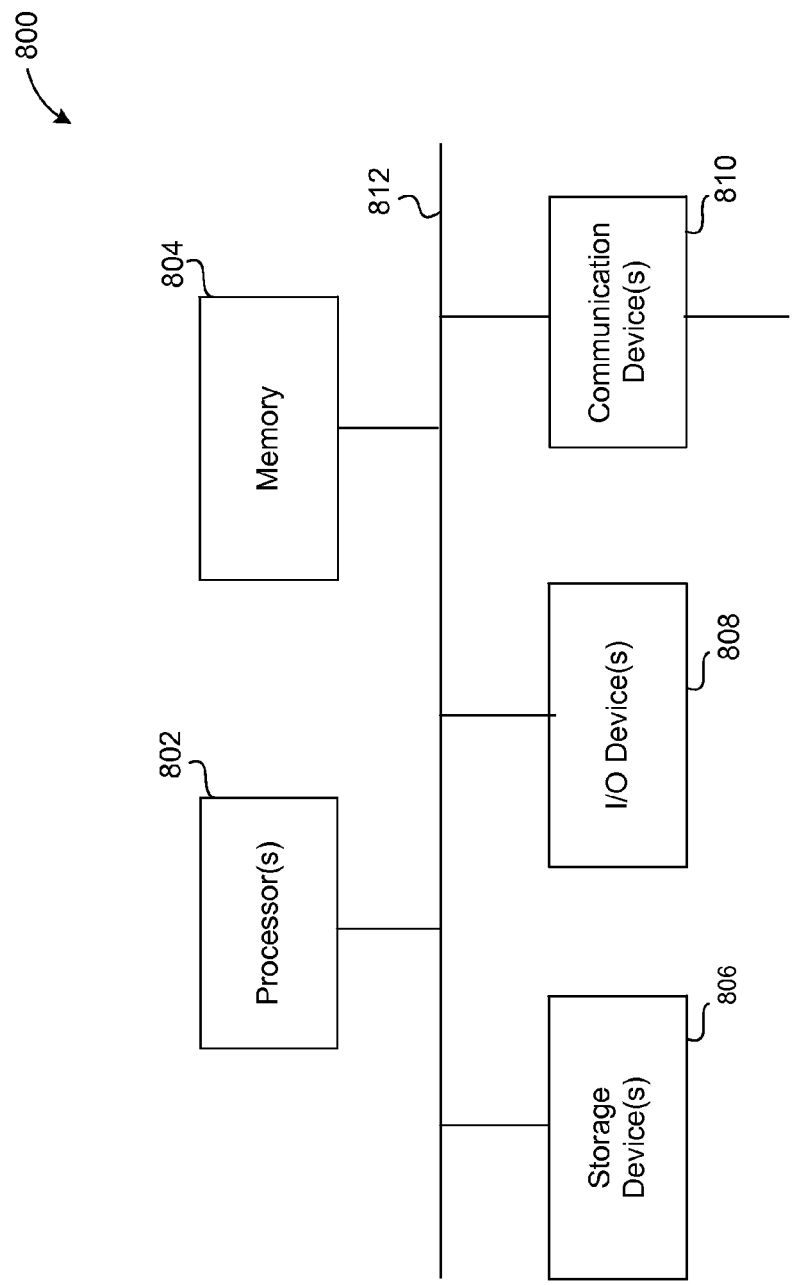
FIG. 8 illustrates at a high-level an example of the hardware architecture of a processing system that can be used to implement any of the computing devices discussed in the present disclosure.

FIG. 8 illustrates at a high-level an example of the hardware architecture of a processing system 800 that can be used to implement any of the computing devices referred to above, such as a user device, a home automation device, a home device, etc. Any of these devices each can include multiple instances of an architecture such as shown in FIG. 8 (i.e., multiple computers), particularly server-based systems, and such multiple instances can be coupled to each other via one or more networks.

In the illustrated embodiment, the processing system 800 includes one or more processors 802, memory 804, one or more mass storage devices 806, one or more input/output (I/O) devices 808, and one or more communication device(s) 810, all of which are coupled to one another through an interconnect 812. The interconnect 812 may be or include buses, point-to-point connections, adapters and/or other conventional connection devices.

The processor(s) 802 can be or include, for example, one or more general-purpose programmable microprocessors, digital signal processors (DSPs), microcontrollers, application specific integrated circuits (ASICs), programmable gate arrays, or the like, or a combination of such devices. The processor(s) 802 control the overall operation of the processing device 800.

Memory 804 can be or include one or more physical storage devices, which may be in the form of random access memory (RAM), read-only memory (ROM) (which may be erasable and programmable), flash memory, miniature hard disk drive, or other suitable type of storage device, or a combination of such devices. The mass storage device (s) 810 may be or include one or more hard drives, digital versatile disks (DVDs), flash memories, or the like. The memory 804 and/or the mass storage device(s) 806 can store (individually or collectively) data and instructions that configure the processor(s) 802 to execute operations in accordance with the techniques described above.

The communication devices 810 can be or include, for example, an Ethernet adapter, cable modem, Wi-Fi adapter, cellular transceiver, Bluetooth or Bluetooth Low Energy (BLE) transceiver, or the like, or a combination thereof. For example, in the case of a user device, the communication devices 810 can be or include, for example, a cellular telecommunications transceiver (e.g., 3G or 4G/LTE), Wi-Fi transceiver, Bluetooth or BLE transceiver, or the like, or a combination thereof.

Depending on the specific nature and purpose of the processing device 800, the I/O devices 810 can include devices such as a display (which may be a touch screen display), audio speaker, keyboard, mouse or other pointing device, microphone, camera, etc. Note that these I/O devices may be unnecessary, however, if the processing device 800 is embodied solely as a server computer.

Unless contrary to physical possibility, it is envisioned that (i) the methods/steps described herein may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software used to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

What is claimed is:

1. A home automation device, comprising:
   a processor;
   a communication unit coupled to the processor and configured to:
   communicate with remote devices physically located within a specified range of the home automation device, via a short-range high-speed wireless communication link, to control the remote devices, wherein to communicate includes to provide the remote devices the short-range high-speed wireless communication link to enable communication at the remote devices;
   detect, within the specified range, a short-range high-speed wireless communication signal being broadcast by another home automation device; and
   transmit, upon detection of said short-range high-speed wireless communication signal, a power-down message to said another home automation device, the power-down message requesting said another home automation device to decrease the short-range high-speed wireless communication signal.

2. The home automation device of claim 1, wherein the short-range high-speed wireless communication link operates at a multi-gigabit-per-second (MGbps) rate, and wherein the short-range high-speed wireless communication signal is broadcast at the MGbps rate.

3. The home automation device of claim 1, wherein the communication unit is further configured to:
   receive, from a social networking system, user profile data associated with users of the social networking system.

4. The home automation device of claim 3, wherein the remote devices include mobile devices and home devices, wherein the communication unit is further configured to:
   detect, via the short-range high-speed wireless communication link, a physical presence of a particular user of the social networking system within the specified range, based on a particular detection, of a particular signal from a particular user mobile device of the particular user;
   determine a particular user profile associated with the particular user physically present based on the user profile data received from the social networking system; and
   control, based on the particular user profile, a particular home device physically located within the specified range.

5. The home automation device of claim 4, wherein the particular home device comprises any of an audio/video streaming device, a telephone device, an image capturing device, or a thermostat.

6. The home automation device of claim 4, wherein the particular user mobile device comprises any of a smartphone or a tablet.

7. The home automation device of claim 4, wherein the user profile data comprises user IDs, user permissions associated with the user IDs, user demographics associated with the user IDs, or user activities associated with the user IDs.

8. The home automation device of claim 3, wherein the home automation device further comprises a user profile module configured to store the user profile data received from the social networking system.

9. The home automation device of claim 1, wherein the communication unit includes a power-line adapter for communicating via a wired communication link, and wherein the wired communication link comprises an Ethernet link.

10. The home automation device of claim 1, wherein the communication unit includes a Wireless-Gigabit (WiGig) adapter for communicating via the wireless communication link, and wherein the wireless communication link comprises a WiGig link.

11. The home automation device of claim 1, wherein the home automation device further comprises multiple sensors, the multiple sensors including any of a carbon-monoxide sensor, a smoke detection sensor, or an image capture sensor.

12. A method, comprising:
   broadcasting, within a specified range, a communication signal to multiple remote devices via a short-range wireless communication link at a multi-gigabit-per-second (MGbps) rate, the multiple remote devices including one or more user mobile devices and one or more home devices, wherein the broadcasted communication signal enables the one or more user devices to transmit data via the short-range wireless communication link;
   monitoring within the specified range to detect a short-range wireless communication signal being broadcast at the MGbps rate by a remote home automation device; and
   upon detection of the short-range wireless communication signal within the specified range, transmitting a power-down message to the remote home automation device, the power-down message requesting the remote home automation device to decrease the short-range wireless communication signal, thereby maintaining the communication signal as an only signal being broadcast within the specified range via the short-range wireless communication link at the MGbps rate.

13. The method of claim 12, further comprising:
   receiving, from a social networking system via a wired communication link, user profile data associated with users of the social networking system; and
   storing the user profile data associated with the users of the social networking system.

14. The method of claim 13, further comprising:
- detecting a particular signal from a particular user mobile device of a particular user, the particular signal indicative of a physical presence of the particular user within the specified range;
- identifying, from the user profile data received from the social networking system, particular user profile associated with the particular user detected based on the particular signal; and
- controlling the one or more home devices based on the particular user profile identified.

15. The method of claim 14, wherein the particular signal includes a user ID associated with the particular user, the user ID identifying a user account of the particular user at the social networking system, wherein the user profile data includes the particular user profile stored in association with the user ID, whereby the particular user profile is identified based on an association with the user ID.

16. The method of claim 12, further comprising:
- determining that a value of a sensor output is within a specified threshold range;
- detecting a particular signal from a particular user mobile device of a particular user, the particular signal indicative of a physical presence of the particular user within the specified range;
- transmitting, via the short-range wireless communication link, a notification to the particular user mobile device to alert the particular user of the value of the sensor output being within the specified threshold range.

17. A home automation device, comprising:
- a processor;
- a user preferences module coupled to the processor and configured to store user profile data associated with users of a social networking system;
- a wired communication module coupled to the processor and configured to receive the user profile data from the social networking system via a wired communication link;
- a wireless communication module coupled to the wired communication module and configured to communicate with remote devices physically located within a specified range of the home automation device, via a short-range high-speed wireless communication link, the remote devices including one or more user mobile devices and one or more home devices, wherein the wireless communication module is further configured to:
  - detect a physical presence of a particular user within the specified range based on a particular detection of a particular signal from a particular user mobile device of the particular user;
  - determine a particular user profile associated with the particular user based on the user profile data; and
  - control the one or more home devices based on the particular user profile; and
- a signal management module coupled to the wireless communication module and configured to detect, within the specified range, a short-range high-speed wireless communication signal broadcast by another home automation device, and to transmit, in response to a detection of said short-range high-speed wireless communication signal, a power-down message to said another home automation device, the power-down message requesting said another home automation device to decrease the short-range high-speed wireless communication signal.

18. The home automation device of claim 17, wherein the wired communication module is a power-line adapter and wherein the wired communication link comprises an Ethernet link.

19. The home automation device of claim 17, wherein the wireless communication module is a Wireless-Gigabit (WiGig) adapter and wherein the short-range high-speed wireless communication link comprises a WiGig link.

20. The home automation device of claim 17, wherein the user profile data comprises user IDs, user permissions associated with the user IDs, user preferences associated with the user IDs, user demographics associated with the user IDs, and user activities associated with the user IDs.

* * * * *